United States Patent
Noll

(10) Patent No.: US 10,223,190 B2
(45) Date of Patent: Mar. 5, 2019

(54) IDENTIFICATION OF STORAGE SYSTEM ELEMENTS CAUSING PERFORMANCE DEGRADATION

(71) Applicant: International Business Machines Corporation, Armonk, NY (US)

(72) Inventor: Dietmar Noll, Bad Soden-Salm (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/178,152

(22) Filed: Jun. 9, 2016

(65) Prior Publication Data

US 2017/0161131 A1 Jun. 8, 2017

Related U.S. Application Data

(63) Continuation of application No. 14/956,584, filed on Dec. 2, 2015, now Pat. No. 9,418,088.

(51) Int. Cl.
*G06F 17/30* (2006.01)
*G06F 7/00* (2006.01)
(Continued)

(52) U.S. Cl.
CPC ........ *G06F 11/079* (2013.01); *G06F 11/0727* (2013.01); *G06F 11/0754* (2013.01); *G06F 11/0772* (2013.01); *G06F 11/3034* (2013.01); *G06F 11/3452* (2013.01); *H04L 41/0631* (2013.01); *H04L 41/142* (2013.01); *H04L 43/0817* (2013.01); *H04L 67/1097* (2013.01); *G06F 11/3055* (2013.01); *G06F 11/3409* (2013.01)

(58) Field of Classification Search
CPC ................................. G06F 17/30306
USPC ........................................ 707/754
See application file for complete search history.

(56) References Cited

U.S. PATENT DOCUMENTS 5,842,202 A 11/1998 Kon
6,026,391 A 2/2000 Osborn et al.
(Continued)

FOREIGN PATENT DOCUMENTS

JP 2006107126 A 4/2006
WO 2008079955 A2 7/2008

OTHER PUBLICATIONS

Breitgand et al., "Root-Cause Analysis of SAN Performance Problems: An I/O Path Affine Search Approach", © 2005 IEEE, May 15-19, 2005, pp. 251-264, <http://ieeexplore.ieee.org/xpl/articleDetails.jsp?tp=&arnumber=1440794&searchWithin%3DRoot-cause+Analysis%26sortType%3Ddesc_p_Publication_Year%26queryText%3DStorage+Resource+Management>.

(Continued)

*Primary Examiner* — Pavan Mamillapalli
(74) *Attorney, Agent, or Firm* — Alexander G. Jochym

(57) ABSTRACT

A tool for improving identification of one or more storage system elements responsible for a performance degradation in a digital storage system. The tool records performance metric data for the one or more storage system elements in a database. The tool locates one or more outliers in the performance metric data for a focus time window using a statistical criterion. The tool calculates a problem contribution probability value for at least one of the one or more outliers. The tool determines a sequential list of outliers, wherein an order in the sequential list of outliers is determined using the problem contribution probability value.

20 Claims, 6 Drawing Sheets

(51) Int. Cl.
*G06F 11/07* (2006.01)
*H04L 29/08* (2006.01)
*G06F 11/30* (2006.01)
*G06F 11/34* (2006.01)
*H04L 12/24* (2006.01)
*H04L 12/26* (2006.01)

(56) References Cited

U.S. PATENT DOCUMENTS

| | | | |
|---|---|---|---|
| 6,434,543 B1 | 8/2002 | Goldberg et al. | |
| 6,604,096 B1 * | 8/2003 | Couch | G06F 17/30306 707/999.004 |
| 7,058,646 B1 | 6/2006 | Loboz et al. | |
| 7,206,785 B1 | 4/2007 | Stephens | |
| 7,325,016 B1 | 1/2008 | Shee | |
| 7,386,536 B1 * | 6/2008 | Ramesh | G06F 17/30306 707/999.001 |
| 7,395,537 B1 * | 7/2008 | Brown | G06F 17/30306 707/999.001 |
| 7,542,998 B1 * | 6/2009 | Lavie | G06F 17/30306 707/999.102 |
| 7,562,094 B1 | 7/2009 | Nadel et al. | |
| 7,568,229 B1 * | 7/2009 | Nachenberg | G06F 17/30306 707/999.009 |
| 7,668,804 B1 * | 2/2010 | El-Helw | G06F 17/30306 707/719 |
| 8,041,543 B2 | 10/2011 | Mopur et al. | |
| 8,285,752 B1 | 10/2012 | Golan et al. | |
| 8,335,794 B1 | 12/2012 | Goodson et al. | |
| 8,442,947 B2 | 5/2013 | Veres et al. | |
| 8,635,376 B2 | 1/2014 | Barrett et al. | |
| 8,972,361 B1 | 3/2015 | Reiner et al. | |
| 2003/0187849 A1 * | 10/2003 | Ruby | G06F 17/30286 707/999.01 |
| 2005/0086263 A1 | 4/2005 | Ngai et al. | |
| 2005/0149505 A1 | 7/2005 | Bossman et al. | |
| 2005/0234900 A1 * | 10/2005 | Bossman | G06F 17/30306 707/999.004 |
| 2005/0262378 A1 | 11/2005 | Sleeman et al. | |
| 2009/0132602 A1 | 5/2009 | Brown et al. | |
| 2009/0327854 A1 | 12/2009 | Chhajer et al. | |
| 2010/0082517 A1 | 4/2010 | Schapker et al. | |
| 2011/0153594 A1 | 6/2011 | Hagenbuch et al. | |

OTHER PUBLICATIONS

Jayasinghe et al., "An Infrastructure for Automating Large-scale Performance Studies and Data Processing", 2013 IEEE International Conference on Big Data, © 2013 IEEE, Oct. 6-9, 2013, pp. 187-192, <http://ieeexplore.ieee.org/xpl/articleDetails.jsp?tp=&arnumber=6691573&searchWithin%3DPerformance%26searchWithin%3DData+Analysis%26sortType%3Ddesc_p_Publication_Year%26queryText%3DStorage+Resource+Management>.

"Storage Performance Management", © 2015 IntelliMagic, printed on: Oct. 14, 2015, 2 pages, <https://www.intellimagic.net/what-is-spm>.

U.S. Appl. No. 14/956,584, filed Dec. 2, 2015.

List of IBM Patents or Patent Applications Treated as Related (Appendix P), filed herewith.

* cited by examiner

US 10,223,190 B2

IDENTIFICATION OF STORAGE SYSTEM ELEMENTS CAUSING PERFORMANCE DEGRADATION

BACKGROUND

The present invention relates to the field of digital storage systems, in particular to identification of storage system elements responsible for a performance degradation.

Digital storage systems, such as Storage Area Networks (SANs), can contain a large number of components. Storage Resource Management Systems or other computer systems may record large amounts of performance related data. If a decrease in performance in the digital storage system is detected a user may have to manually sift through large amounts of data to identify anomalous or abnormal performance data in an effort to locate the cause of the performance degradation.

SUMMARY

Aspects of an embodiment of the present invention disclose a method, a computer system, and a computer program product for improving identification of one or more storage system elements responsible for a performance degradation in a digital storage system. The method includes recording performance metric data for the one or more storage system elements in a database, wherein the performance metric data is time dependent, wherein the performance metric data includes a system configuration descriptive of one or more connections between one or more network components and a plurality of digital storage devices. The method includes locating one or more outliers in the performance metric data for a focus time window using a statistical criterion. The method includes calculating a problem contribution probability value for at least one of the one or more outliers, wherein the problem contribution probability value is a weighted value based, at least in part, on an instantiated configuration dependency tree and an instantiated performance metric dependency tree, wherein the problem contribution probability value for at least one of the one or more outliers is calculated based, at least in part, on a normalized value of the at least one of the one or more outliers, the weighting value calculated from the instantiated configuration dependency tree and the instantiated performance metric dependency tree, a temporal difference between an acquisition time of the at least one of the one or more outliers and the focus time, and one or more constants. The method includes determining a sequential list of outliers, wherein an order in the sequential list of outliers is determined using the problem contribution probability value.

DETAILED DESCRIPTION

Figure 1:
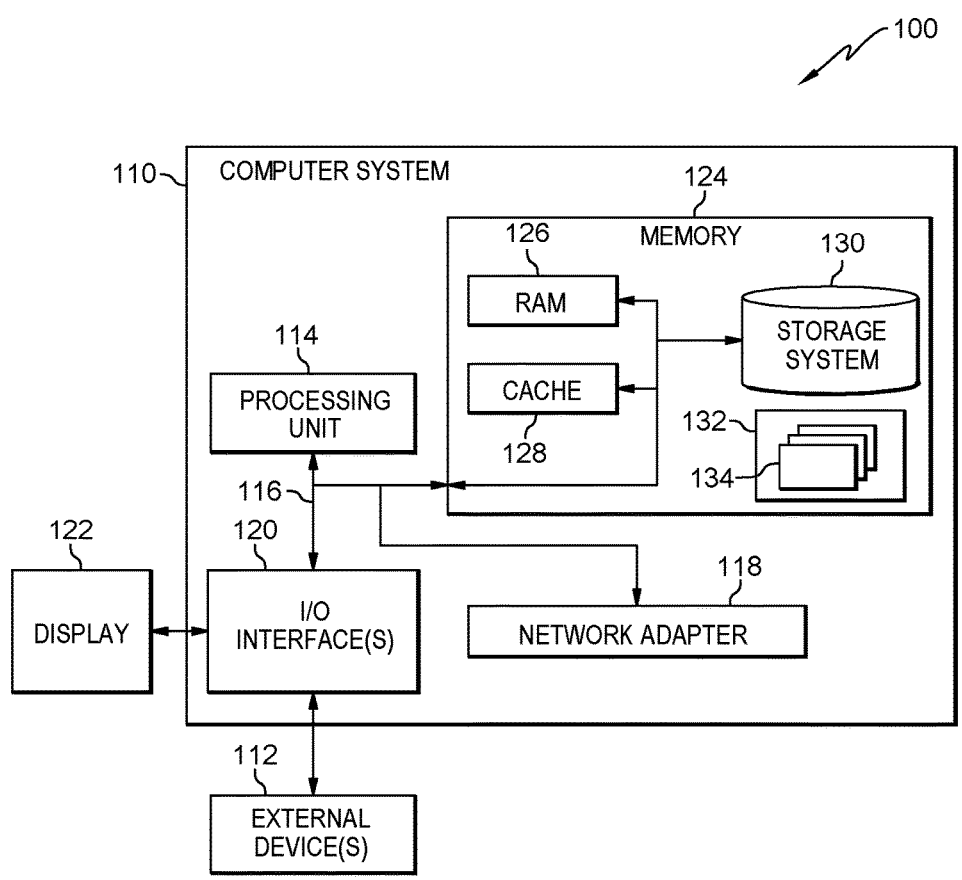
FIG. 1 depicts components of a digital storage system, such as the digital storage system of FIG. 2.

This digital storage system may have the advantage that it requires less work to identify the cause of the performance alert. The sequential list of outliers is provided as a guide or to trigger the investigation of particular storage system elements.

In one aspect the invention provides for a digital storage system. The digital storage system comprises storage system elements. The visible storage system elements comprise network components. Network components as used herein comprise components which enable digital devices or apparatuses to exchange information. The storage system further comprises multiple digital storage devices. The multiple digital storage devices are connected by the network components. Together the storage system elements form a set of networked digital storage devices. The digital storage system further comprises a database. The digital storage system further comprises a memory for storing machine-executable instructions. The database comprises one or more predetermined configuration dependency tree. The database further comprises one or more predetermined performance metric dependency tree.

The one or more predetermined configuration dependency tree may be descriptive of a dependency in the connections between the multiple digital storage units using the network components. The one or more predetermined configuration dependency tree may also contain a description of how performance data between the various components of the storage system elements are related. The one or more performance metric dependency tree may contain dependencies which relate how the various performance metrics which may be measured on the storage system elements are interrelated. The one or more performance metric dependency trees may also contain information, instructions, or commands (such as a script or executable code) which detail how to weight a particular dependency.

The digital storage system further comprises a processor for executing the machine-executable instructions. Execution of the machine-executable instructions further cause the processor to repeatedly record performance metric data descriptive of the performance of the storage system elements in the database. The performance data is time dependent. The database stores a system configuration descriptive of connections between the network components and the multiple digital storage devices.

The system configuration for example may contain information about how the storage system is configured for example what elements are comprised in the system and how they relate to each other and how they are configured. Performance data may be information about particular operational aspects like the IO operations per second executed by a particular digital storage device at a particular time.

Execution of the machine-executable instructions cause the processor to repeatedly record performance metric data descriptive of the performance of the storage system elements in the database. The performance data is time dependent. The database stores a system configuration descriptive of connections between the network components and the multiple digital storage devices. Execution of the machine-executable instructions further cause the processor to receive a performance alert. A perform alert as used herein encompasses indication that there is failure or degradation in the digital storage system which has resulted in a recognizable decrease in performance. The performance alert for instance may be generated automatically by looking at various performance data of the digital storage system. In other instances the performance alert may be received manually, for example from input from a user or operator. In yet other examples the performance alert may be received from another computer system. For example the user of the digital storage system may send the performance alert remotely. The performance alert comprises a focus time.

The focus time is a time which indicates approximately when or exactly when the event that triggered the performance alert occurred. Execution of the machine-executable instructions further cause the processor to construct a focus time window that brackets the focus time. The focus time window is a start and stop time for which the recorded performance metric data is analysed. The focus time is within the focus time window. The focus time window in some examples may be constructed by taking a predetermined interval before and after the focus time.

Execution of the machine-executable instructions further cause the processor to construct an instantiated configuration dependency tree using the system configuration and the one or more predetermined configuration dependency tree. The one or more predetermined configuration dependency tree maps performance relationships between the storage system elements. Execution of the machine-executable instructions further cause the processor to construct an instantiated performance metric dependency tree using the instantiated performance metric dependency tree and performance metric data. The performance metric dependency tree maps dependency relationships between the performance metric data. The system configuration indicates the configuration and the connection between the storage system elements within the focus time window. The one or more predetermined configuration dependency tree and the one or more predetermined performance metric dependency tree can then be used to fill the system configuration with data that maps the various dependencies.

Execution of the machine-executable instructions further cause the processor to locate outliers in the performance metric data using a statistical algorithm. There are standard statistical algorithms or methods which enable the identification of data points which are likely outside of a probability distribution which accurately models the data in question. The outliers may therefore also be considered to be anomalies or anomalous data points. The term outlier may in some examples be replaced with the term anomaly or anomalous data point. The outliers may be indications of the failure of particular components or storage system elements.

Execution of the machine-executable instructions further cause the processor to calculate a problem contribution probability value for at least a portion of the outliers. The problem contribution probability value is weighted using the instantiated configuration dependency tree and the instantiated performance metric dependency tree. The problem contribution probability value is a probability that a particular outlier is responsible for the event which caused the performance alert. The instantiated configuration dependency tree and the instantiated performance metric dependency tree are used to weight these probabilities to incorporate expert knowledge to help to narrow and identify the cause of the performance alert with at least work as possible. Execution of the machine-executable instructions further cause the processor to determine a sequential list of outliers. The order in the sequential list is determined using the problem contribution probability value. The sequential list of outliers may then be considered to be a list of outliers which are ranked in order of being the possible cause of the performance alert.

In another aspect the invention provides for a computer program product for operating a digital storage system. The computer program product comprises a computer-readable storage medium having program instructions embodied therewith. The digital storage system comprises storage system elements. The storage system elements comprise network components. The storage system further comprises multiple digital storage devices. The multiple digital data storage devices are connected by the network components. The digital storage system comprises a database. The computer-readable storage medium is not a transitory signal per se. The program instructions are executable by a processor to perform a method corresponding to the steps caused by the machine-executable instructions.

In another aspect the invention provides for a method of operating a digital storage system. The steps of the method are equivalent to the steps performed by the processor operating the digital storage system.

In another embodiment the construction of the instantiated performance metric dependency tree comprises filling the system configuration with values from the one or more predetermined performance metric dependency tree. The particular system configuration may not map the one or more predetermined performance metric dependency tree exactly.

In some examples, the system configuration can optionally be used to prune or to edit which values are included in the instantiated performance metric dependency tree. In some examples the node and branch structure of the instantiated performance metric dependency tree can be made equivalent to the structure of the system configuration and/or the structure of the predetermined configuration dependency tree.

In another embodiment constructing the instantiated configuration dependency tree comprises filling the system configuration with values from the one or more predetermined configuration dependency tree. As with the instantiated performance metric dependency tree, the instantiated configuration dependency tree may be constructed using the actual system configuration to determine which values are taken from the one or more predetermined configuration dependency tree.

The predetermined dependency trees can for example be considered to contain "expertise" or represent expert knowledge in that they represent for the individual devices, how the various elements comprising the device are dependent upon one another. This may describes general relationships and/or dependencies between devices or components of storage system elements. For example, configuration data may describe how a storage volume is dependent on a pool, which in turn is dependent on the disk drives. When the dependency tree is instantiated, this "template" of abstract relations/dependencies may be filled in with the actual configuration of the device being analyzed. For example, "Volume 101 is dependent on pool A, which is dependent on disks II, III, IV, VII, and IX". The predetermined dependency tree may also carry weights for each dependency, which are then used in the PCP calculation to better reflect the actual influence of each dependency on the overall impact.

In another embodiment the problem contribution probability value for an outlier selected from at least a portion of the outliers is calculated using the following formula:

$$PCP = ((Ov + K1) * (Df_{Total}))/(OdTOI + K2).$$

The value PCP is the problem contribution probability value which is calculated. The value Oe is a normalized value of the outlier. After all of the outliers are identified they may be normalized to standardize the calculation of the problem contribution probability value. The value $Df_{total}$ is a weighting value calculated from the instantiated configuration dependency tree and the instantiated performance metric dependency trees. The weightings from both of these dependency trees are taken and used to calculate the problem contribution probability value. The value OdTOI is a temporal difference between the acquisition time of the outlier and the focus time. This is used to weight values which occur closer in time to the focus time. The values K1 and K2 are constants which are chosen so that the problem contribution probability value can be calculated without errors such as a divide by 0 error and so that the problem contribution probability is calculated consistently.

In another embodiment the one or more predetermined performance metric dependency tree is a template.

In another embodiment the one or more predetermined configuration dependency tree is a template.

In both of these cases the templates may be specific to particular types of devices or groups of storage devices. For example when constructing the instantiated performance metric dependency tree or the instantiated configuration dependency tree the processor may look at the system configuration and see what sort of devices are connected together and then find appropriate templates to provide the values. These templates may have the benefit that it may make the calculation of the problem contribution probability value more flexible and easy to be modified.

In another embodiment the statistical algorithm identifies the outliers by identifying performance metric data outside of a probability band statistically expected to contain all of the performance metric data. This may have the benefit of accurately identifying the outliers.

In another embodiment the statistical algorithm is Chauvenet's algorithm. The use of this particular algorithm may have the benefit that it has been demonstrated to perform accurately for identifying the outliers for a digital storage system.

In another embodiment the database comprises historical data. The location of the outliers in the performance metric data may be at least partially identified using the historical data. For example if a particular value for a metric has occurred in the historical data then the data is likely not to be an outlier. If a value is outside of the historical data then this may be a good indicator that that particular data point is an outlier.

For example the outliers could be analyzed by comparing them or evaluating the data in comparison to the performance data of the same entity from possibly a day, a week, a month, a quarter or even a year or years ago. The difference in these historical values may be also be used in the calculation of the problem contribution probability value also.

In another embodiment the database comprises historical data. The problem contribution probability value is at least partially weighted using the difference between the at least a portion of the outliers and the historical data. Doing this may have the benefit of reducing the number of outliers which are incorrectly identified.

In another embodiment the system configuration is time dependent. Execution of the machine-executable instructions further causes the processor to determine the system configuration for the focus time window. This may have the benefit of automatically adjusting the system configuration for the actual focus time window.

In some examples the configuration may change during the focus time window. In such instances it may be possible to divide the focus time window into different portions using different configurations and separately calculating the problem contribution probability value for these different portions of the focus time window.

In another embodiment the digital storage system comprises one or more access servers. The one or more access servers may provide an access point to access the storage system.

In another embodiment the one or more access servers expose the storage system as block level storage.

In another embodiment the digital storage system is a storage area network.

In another embodiment the digital storage system comprises a storage resource management system. The storage resource management system comprises the database.

In another embodiment the database is at a remote location. For example the database could be located on a separate computer system that is connected to the digital storage system via a network connection. In other examples the database is located in a cloud which is accessible via the internet.

In another embodiment the storage resource management system comprises a display. The storage resource management system is configured to sequentially display the sequential list of outliers. This may be useful for an operator or user of the storage resource management system to analyze and determine the cause of the performance alert.

In another embodiment the performance metric data comprises: device states, performance data, application activity, storage capacity utilization, air rates, air counters, saturation levels, and combinations thereof.

In another embodiment the method further comprises determining a storage system element chosen from the storage system elements for each item on a sequential list of outliers. In this embodiment a particular storage system element is identified for an entry on the sequential list of outliers. This provides a storage system element that a user or operator can check to see if it is the cause of the performance alert.

In another embodiment the method further comprises sequentially examining the storage system element or performance degradation according to the list of outliers.

FIG. 1 is a block diagram, generally designated 100, depicting components of a data processing system (such as client system 202 and access server 204 of digital storage system 200), in accordance with an embodiment of the present invention. It should be appreciated that FIG. 1 provides only an illustration of one implementation and does not imply any limitations with regard to the environments in that different embodiments can be implemented. Many modifications to the depicted environment can be made.

In the illustrative embodiment, client system 202 and access server 204 in digital storage system 200 is shown in the form of a general-purpose computing device, such as computer system 110. The components of computer system 110 can include, but are not limited to, one or more processors or processing unit(s) 114, memory 124, and bus 116 that couples various system components including memory 124 to processing unit(s) 114.

Bus 116 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 110 typically includes a variety of computer system readable media. Such media can be any available media that is accessible by computer system 110, and it includes both volatile and non-volatile media, removable and non-removable media.

Memory 124 can include computer system readable media in the form of volatile memory, such as random access memory (RAM) 126 and/or cache memory 128. Computer system 110 can further include other removable/non-removable, volatile/non-volatile computer system storage media. By way of example only, storage system 130 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 116 by one or more data media interfaces. As will be further depicted and described below, memory 124 can include at least one computer program product having a set (e.g., at least one) of program modules that are configured to carry out the functions of embodiments of the invention.

Program/utility 132, having one or more sets of program modules 134, can be stored in memory 124 by way of example, and not limitation, as well as an operating system, one or more application programs, other program modules, and program data. Each of the operating systems, one or more application programs, other program modules, and program data, or some combination thereof, can include an implementation of a networking environment. Program modules 134 generally carry out the functions and/or methodologies of embodiments of the invention as described herein. Computer system 110 can also communicate with one or more external devices 112 such as a keyboard, a pointing device, a display 122, etc., or one or more devices that enable a user to interact with computer system 110 and any devices (e.g., network card, modem, etc.) that enable computer system 110 to communicate with one or more other computing devices. Such communication can occur via Input/Output (I/O) interface(s) 120. Still yet, computer system 110 can communicate with one or more networks such as a local area network (LAN), a general wide area network (WAN), and/or a public network (e.g., the Internet) via network adapter 118. As depicted, network adapter 118 communicates with the other components of computer system 110 via bus 116. It should be understood that although not shown, other hardware and software components, such as microcode, device drivers, redundant processing units, external disk drive arrays, RAID systems, tape drives, and data archival storage systems can be used in conjunction with computer system 110.

Figure 2:
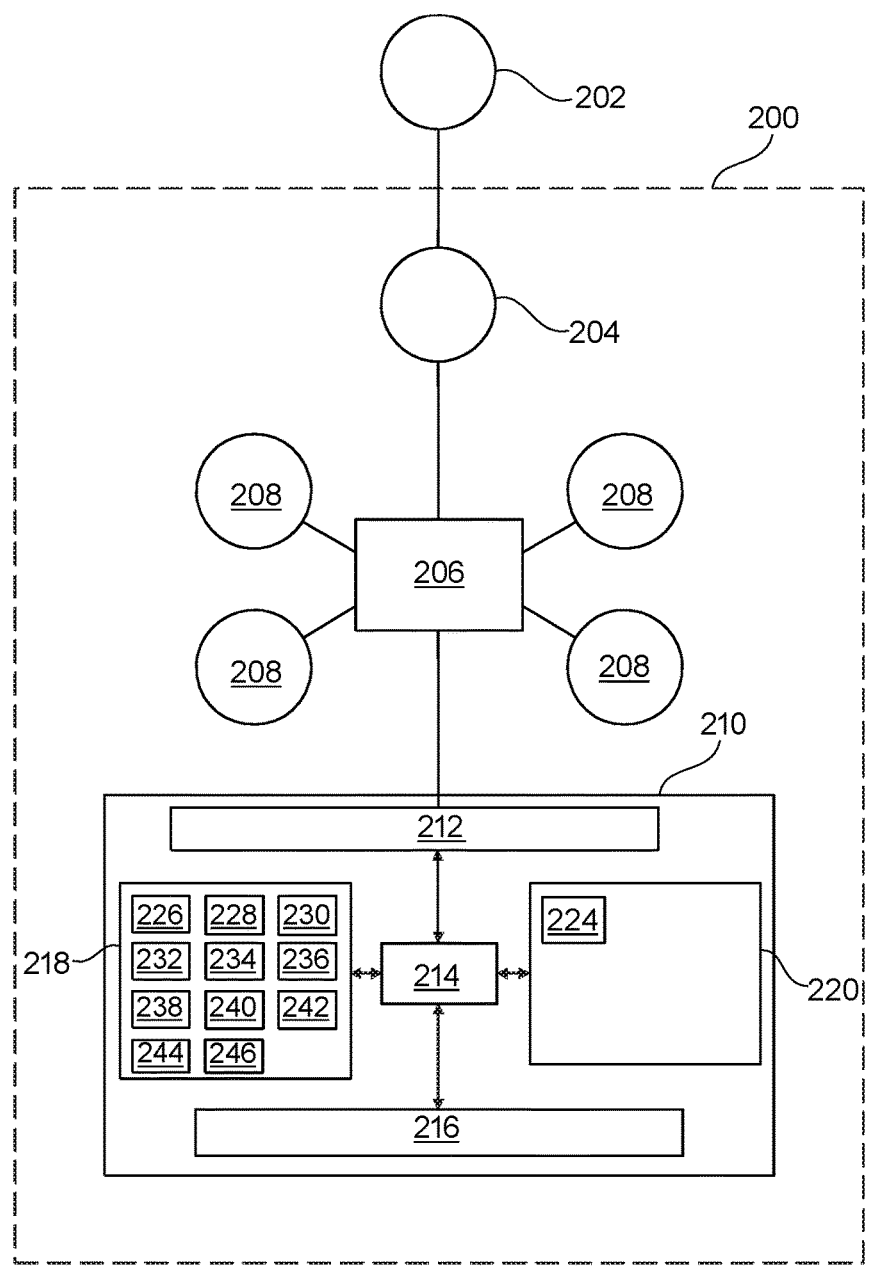
FIG. 2 illustrates an example of a digital storage system.

FIG. 2 shows an example of a digital storage system 200. There is a client system 202 that is connected to the digital storage system 200. The client system 202 optionally connects to an access server 204 which acts as an access point to the digital storage system 200. In this example the access server 204 is connected to the network components 206. 206 may represent a variety of network components which are used to network together a group of digital storage devices 208. The network interface 212 of a database 210 is also connected to the network components 206. The database 210 may be part of a storage resource management system. The database 210 or storage resource management system also comprises a processor 214. The processor is connected to the network interface 212, the user interface 216 and also additionally computer storage 218 and computer memory 220.

The computer memory 220 is shown as containing machine-executable instructions 224 which enable the processor 214 to perform a number of steps which enable the processor to determine a sequential list of outliers. The computer storage 218 may also be memory directly accessible to the processor 214 or it may be other storage such as hard drives or other persistent memory. The computer storage 218 is shown as containing performance metric data 226 that has been acquired by the database 210. The computer storage 218 is further shown as containing system configuration data 228. The system configuration data 228 identifies the exact configuration of the digital storage devices 208 and the network components 206 as a function of time. The computer storage 218 is further shown as containing an alert 230 with a focus time. The alert 230 could have been entered using the user interface 216 or it may have been received via a network connection or may have been generated by a computation performed by the processor 214.

The computer storage 218 is further shown as containing a focus time window 232 that was constructed using the focus time. A predetermined interval before and after the focus time may be used to generate the focus time window. The computer storage 218 is further shown as containing one or more predetermined configuration dependency tree 234 and one or more predetermined performance metric dependency tree 236. The processor then uses the predetermined dependency trees 234 and 236 along with the system configuration data 228 to generate an instantiated configuration dependency tree 238 and an instantiated performance metric dependency tree 240 which are shown stored in the computer storage 218. The computer storage may further contain outliers 242 which were identified using the machine-executable instructions 224 to analyze the performance metric data 226. The computer storage 218 is further shown as containing problem contribution probability values 244 which are calculated for the outliers 242. The computer storage 218 is further shown as containing a sequential list of outliers 246 that was constructed by ranking the outliers 242 with the problem contribution probability values 244.

In one embodiment, a performance alert 230 is received. Next, a focus time window 232 is constructed by bracketing the focus time that was received with the performance alert 230. Next, an instantiated configuration dependency tree 238 is constructed using the system configuration 228 and the one or more predetermined configuration dependency tree 234. Next, the instantiated performance metric dependency tree 240 is constructed using the one or more predetermined performance metric dependency tree 236 and the collected performance metric data 226. Next, the processor uses a statistical algorithm to locate the outliers 242 and the performance metric data 226. Next, a problem contribution probability value 244 is calculated for at least a portion of the outliers 242. The problem contribution probability value is weighted using the instantiated configuration dependency tree 238 and the instantiated performance metric dependency tree 240. Finally, the processor determines a sequential list of outliers 246. The order in the sequential list of outliers may be at least partially determined using the problem contribution probability values 244. In some examples, the "level" in the instantiated dependency tree might also have a role in the order, i.e. that entities/metrics in sub or lower nodes are considered "root causes" because there is no further dependency "underlying", while entities/metrics as nodes in the dependency tree are considered intermediate results (i.e. this outlier/anomaly is caused by an underlying dependency)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Examples may be related to the field of performance monitoring and performance problem root cause determination in the context of storage systems and storage area networks. In the mentioned context, there are a lot of interconnected entities influencing each other and hence influencing the performance of the overall solution as well as the performance of individual entities.

One of the common problems in the field addressed by examples may stem from the large amount of performance data collected by storage resource management systems and the complex relationships between the monitored entities. While the available tools try to allow the user (i.e. the storage administrator) to understand the information behind the data by visualizing the raw data in an appropriate fashion, the process of tracking down a reported or otherwise recognized problem with the performance of a storage entity (usually an entity visible to the consumer of the storage environment) to the actual cause of the problem, which might be coming from an entity only indirectly related to the entity exposing the problem, is complex and error-prone.

In some solutions to the problem, it largely depends on the knowledge and expertise of the person using the tools, whether he is efficient and fast in identifying the root cause of a performance problem. He would use his expert guess, to identify "suspicious" data points and use these as a starting point for further checking of related entities and further unusual/non-normal data points to get one step further on the path to identify the root cause of a performance degradation.

Unfortunately, with this approach the user has to manually check a lot of data for a large number of related entities, with the dependency tree to check being as complex as the entity dependency tree of the influencing entities (actually even multiplying the complexity because of the large number of metrics to check per entity).

Examples may teach an approach to overcome the problem by guiding the user to check the data first, which has the highest likelihood of being a major contributor to or even the root cause of the performance problem.

Examples may provide for a system and method to automatically assess the large amount of performance and configuration data collected by typical SRM solutions to identify data points, which are most likely indicating a non-normal situation, which might be the reason (or at least indicates the best direction for further investigation) for a performance degradation.

In order to achieve this, the collected performance data is analyzed and set into relation with performance data of other entities based on the actual configuration to create a multi-dimensional matrix indicating the "suspectedness" (i.e. the likelihood of being relevant for a performance problem determination activity) for each data point, giving the user a priority order for checking the data to verify the root cause has indeed be identified. This "suspectedness" is expressed as the problem contribution probability.

With the support provided by an implementation of this example, the user needing to identify the root cause of a performance degradation in a storage network can trace down the data points indicating the reason for the degradation much faster while needing to check much less (irrelevant) data.

Examples may help less experienced and knowledgeable users to perform such tasks by providing the necessary guidance to identify relevant data points out of the vast amount of collected performance data.

Examples may providing a new system and a method to automatically analyze data to provide guidance to a user performing a performance problem determination task, solving the problem of turning data into information for this purpose in a way not available before. With this analysis results, it is possible to even take corrective actions in an automated fashion resulting in a changed device configuration to avoid/mitigate a performance problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Storage network management system typically consist of a storage resource management (SRM) server, a corresponding connected central repository to store all relevant system and infrastructure data and a user interface to visualize required information for the end user and to allow configuring and maintaining the system. Such an SRM typically consists of one or more data collectors which gather all kinds of information from the storage network infrastructure via their connectivity to SAN devices, like for example switches/fabrics, storage systems, and/or servers.

Storage network administrators use the UI of the SRM system in order to monitor the health of the SAN environment. "Health" refers to all kinds of relevant data/metrics of the SAN infrastructure which have to be at an appropriate level so that the data center can perform the intended business operation without risk. Examples of such data/metrics are: Device states, performance data, application activity, storage capacity utilization, etc. The storage administrator needs to have an in-depth knowledge about the configuration of the SAN infrastructure and the contained devices in order to determine the root cause of a performance problem, independent whether this has been detected by the SRM system monitoring capabilities, or reported by a consumer of the storage provided by the managed infrastructure, i.e. the owner/administrator of a server, application or business service.

While typical SRM systems may provide graphical and tabular representation and visualization of the collected raw performance data, and might even allow the user to easily navigate to other elements of the configuration, it is essentially the skill and expertise of the user of the SRM system for the particular storage network element potentially causing the performance, which will be the key for the speed and even the success of the investigation of a particular performance problem.

Examples may teach a method to have the SRM system to support the storage administrator in automatically assessing the available raw data and (by taking the configuration dependency into account) guiding the storage administrator in his investigation by determining areas, which are most likely to expose a non-normal behavior. With this guidance, the storage administrator is more likely to identify the root cause of a performance problem successfully in a shorter period of time.

The key aspect of the method described in some examples is the determination of a problem contribution probability (PCP) value for the individual data points collected for a storage network entity and its related entities.

The PCP is a representation of the likelihood of this data point being different than expected, hence potentially contributing to a performance problem for the time represented by the data point. A system implementing this method would most likely consist of two additional components (compared with some SRM systems), one being a statistical evaluation engine, which is used to calculate the raw PCP data for all data points involved in the current assessment based on statistical algorithms This calculation is done by creating a multidimensional matrix PCP values for an entity under investigation (for example a particular storage volume), with the dimensions of the matrix reflecting the various relationships and dependencies of the investigated entity. These dimensions might for example include time, different metrics collected for the entity, data for related entities of the investigated entity (like for example the other storage volumes in the same pool using the same disks as the investigated volume), or any other relevant data.

The individual PCP value for each data point is calculated by assessing its collected value in relation to other values in the analyzed time range (for example by determining the difference from the average value, difference from rolling average values, change rate of rolling average, etc.), but also comparing it to historical values collected for the entity (like previous day, one week ago, one month ago, previous quarter of the year, etc.).

Figure 3:
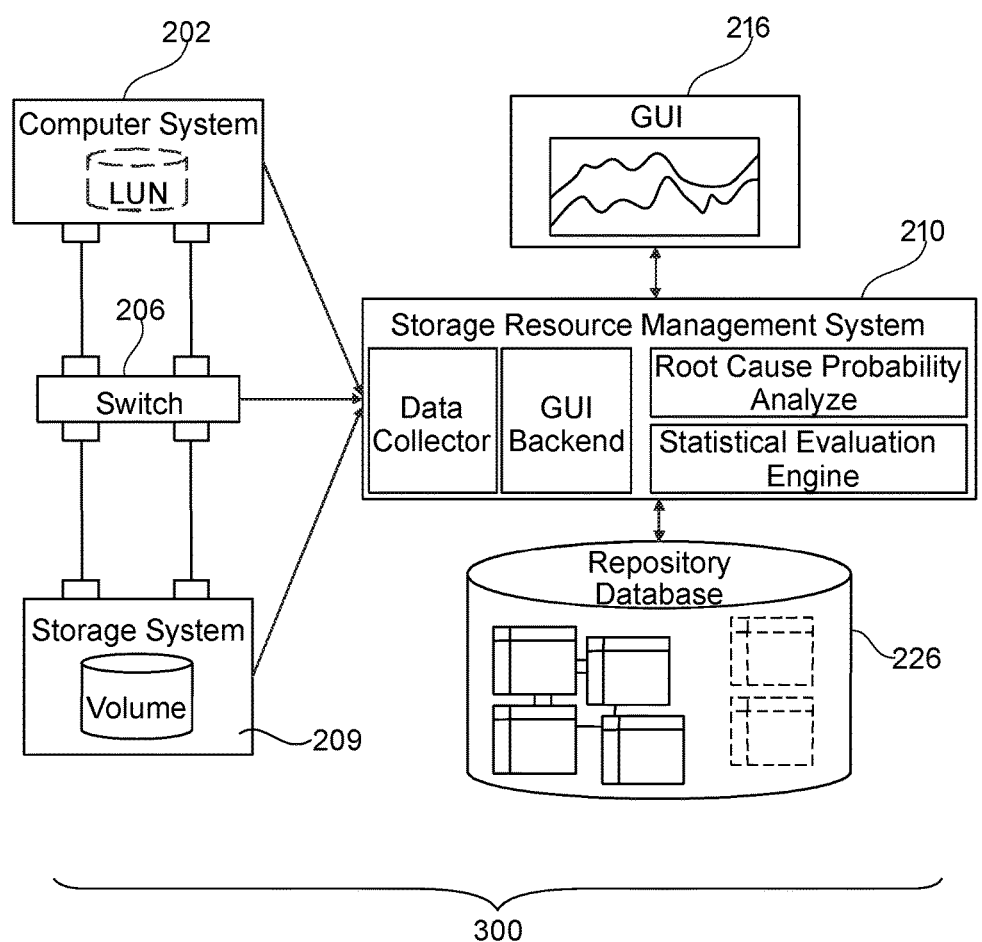
FIG. 3 illustrates a further example of a digital storage system.

The resulting matrix is used by an adviser component, the Root Cause Probability Analyzer, to guide the user to the next dimension or data point to investigate by identifying the next highest PCP value. When the user is switching the investigation context to the new entity by following the guidance of the adviser (i e making this the focus entity for investigation), a new matrix is calculated for this entity. The structure of an possible implementation of a system using some examples based on an SRM solutions is shown in FIG. 3 below:

FIG. 3 shows an alternate example of a digital storage system 300. In this example there is a computer system 202 or a client system which connects to a switch which is equivalent to the switch 206. Connected to the switch 206 is also a number of storage systems 209 with various volumes. This is equivalent to the digital storage devices 208 of FIG. 2. A storage resource management system 210 is also connected to the switch 206. A graphical user interface 216 is available for an operator to investigate performance issues with the switch 206 and/or the digital storage devices 208. The storage resource management system comprises a data collector for collecting the performance metric data 226, a graphical user interface back end for powering the graphical user interface 216 and also a root cause probability analyzer and statistical evaluation engine which is used for determining the sequential list of outliers as was described in FIG. 2. FIG. 3 also shows a repository database 226 which is equivalent to the performance metric data 226 as shown in FIG. 2.

Figure 4:
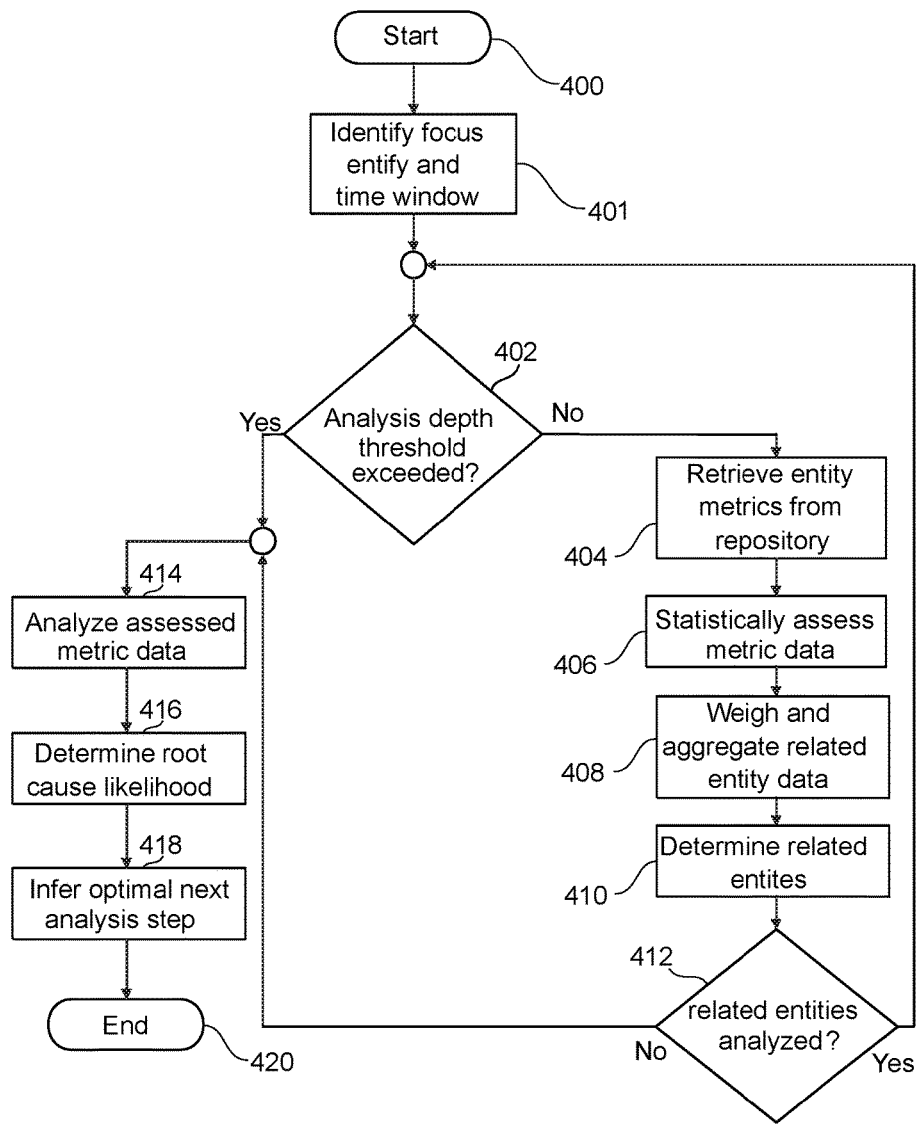
FIG. 4 depicts an algorithm for a method of searching for outlying data points.

The flow described above as the proposed two implementation components would realize it is shown in FIG. 4 below:

FIG. 4 shows a flowchart which shows a method of selecting which of the outliers which are identified will be selected into the portion of outliers for which the problem contribution probability value is calculated. This step starts in step 400. Next in step 401, an identity focus entity and time window are identified. This is the time when the performance alert occurred and identification of what sort of performance issue was identified. The method then proceeds to step 402 which is a question box. The question is: has the analyzed analysis step threshold been exceeded. The analysis step threshold is how many positions to go down on the instantiated configuration dependency tree or the instantiated performance metric dependency tree when deciding which performance metric data to analyze. In step 402, the decision can be used to balance the accuracy and depth of the analysis with the amount of time which is needed to perform the analysis. The amount of time necessary for the analysis can also be considered to be equivalent to the amount of data to be analyzed.

The method then steps to step 404 which is to retrieve entity metrics from the repository. Next in step 406 the retrieved data is statistically assessed. Next in step 408 the data is weighted and aggregated related to the entity data. Next in step 410 related entities are determined. The related entities are performance metrics which are related to the currently analyzed performance metric. The method then proceeds to decision box 412. In decision box 412 the question is have the related entities been analyzed or not. If the answer is yes then the method goes back to step 402. If the answer is no then the method proceeds to step 414. When step 402 is performed if the answer is yes then the method proceeds to step 414. In step 414 the performance metric data is analyzed. Next in step 416 the root cause likelihood is determined. Next in step 418 an optimal next analysis step is inferred. Then in step 420 the method ends.

After identifying the current focus entity and the time window to analyze, the assessment of the various data points would be done by a sequence of retrieving the data from the repository database, determining the statistical representation of the data, calculating the PCP of the data points by doing the necessary weighing and aggregation, and determination of any related entities required to be included in the assessment. The result is stored in a multidimensional matrix for further processing. If there are either no more not analyzed related entities, or a defined analysis depth threshold has been exceeded (to avoid very deep dependency trees or to address circular dependencies), the assessed metric data is then used to figure out, where in the matrix the highest PCP value indicates the most likely root cause of the analyzed performance problem, and to infer the optimal next step for the user to analyze the data for fastest determination of the cause and a corrective action to solve the problem.

To illustrate the approach, the following paragraph describes a simplified embodiment of present invention. In this embodiment, the determination of the PCP is done by using two dependency trees—one for the configuration element dependencies and one for the performance metric dependencies—and overlying them to find the most probable root cause.

In this embodiment, the Root Cause Probability Analyzer (RCA) is responsible for orchestrating how and when the different steps required for identifying the list of probable root causes of a performance issue are carried out.

The probable root causes refer to the values of certain performance metrics of certain SAN elements at certain instants of time. In other words, it is identified, which performance metrics of which elements at which points in time might be responsible for causing the performance issue. The analysis is in this embodiment triggered by receiving some input data from outside world. For example, as a result of a phone call from an application administrator complaining about slow performance of the application, the storage administrator initiates the analysis for a given entity (here the storage volume used by the application) for a given point in time (when the problems were observed by the application administrator). This input data hence contains information about the performance issue observed at the consumer side. Once the input data is received, the RCA determines an appropriate time window. Time window refers to the duration within which the RCA does the required investigations in order to find the probable root cause, and it covers time before and after the point in time used as input for the analysis. The duration of the time window may be a fixed range (like 2 hours before to 2 hours after), but might also depend on a number of other aspects, like for example how far into the past the point in time is in the past and to what level details of the information might no longer be available because of data aggregation. In the end, the size of the time window directly impacts the amount of data to be analyzed, hence the time needed to do the analysis.

After determining the appropriate time window, RCA further uses the dependency trees to identify the different SAN elements and their corresponding metrics, whose performance might have been responsible for causing the performance issue in certain other element. Dependency trees refer to the experience base of the storage administrators and other subject matter experts, which are modeled into trees. The dependency trees in this embodiment provide a means to introduce the necessary knowledge for the automatic analysis by describing how elements and metrics depend on each other and with what weight a particular dependency should be taken into account to calculate the PCP values. The RCA uses two types of dependency trees, 'Element dependency tree' (one or more predetermined configuration dependency tree) and 'Metric dependency tree' (one or more predetermined performance metric tree), which both consists of the dependency relations between different elements with respect to performance of the analyzed device. Metric dependency tree consists of the dependency relations between different metrics with respect to performance The dependency trees represent "generalized" models of the dependencies, which might indicate for example, that the performance of a storage volume in a storage system of a particular type is dependent on the storage pool it belongs to, hence is dependent also on the other storage volumes in that pool because of sharing the same underlying disks. Since the architectures of the various storage systems differ, multiple dependency trees might need to be available for selection of the most appropriate one based on the device to be analyzed, but a dependency tree might also be usable for multiple types of devices.

By retrieving the necessary information about the configuration of the analyzed device at the time to be analyzed from the Repository Database as well as the corresponding performance metrics collected for the time range to be analyzed, the RCA then generates an instantiated dependency trees based by combining the generalized model with the data retrieved from the Repository Database. Such an instantiated dependency tree now describes the individual dependency of a particular volume A directly to its containing pool B as well as indirectly to the other volumes C to H and the disks I to P (referring to the example used to describe generalized dependency tree above). Instantiated dependency trees contains the exact configuration data at a specific instant of time. Data available in an instantiated tree is used by the RCA during investigation for finding the probable root causes.

After generation of an instantiated tree, the RCA framework identifies the SAN elements and their performance metrics (from the list of elements and metrics under investigation) that are more likely responsible for causing the performance issue. In order to achieve this, the RCA uses the Statistical Evaluation Engine to assess the relevant performance metrics for the relevant entities (based on the instantiated dependency trees), for example by using an algorithm called Chauvenet's algorithm. This algorithm helps in identifying different outliers in a performance graph. Outliers denote the spikes (high rise) and valleys (low fall) in a graph. Outliers as described are considered "more suspicious" for contributing to a performance problem than other performance metrics, which do not show significant differences in the time before, while, and after the point in time the performance problem was recognized. For finding the outliers, Chauvenet's algorithm considers the performance graphs of all the metrics of all SAN elements under investigation within the generated time window. The algorithm points out those values of the performance metrics (along with the point in time when that value was recorded) which could have had an impact on certain other metric of another element, thereby causing the performance issue in that element. The result of this evaluation is recorded as individual PCP values for the various entities and metrics.

In this embodiment, the PCP is calculated uses a mathematical formula in order to quantify the impact of each outlier in causing the performance issue. In this embodiment, the following formula could be used:

$$PCP = ((Ov+K1)*(Df_{Total})/(OdTOI+K2),$$

with Ov as Normalized value of an outlier in the analyzed time window, $Df_{Total}$ as calculated dependency value between the analyzed entity and the impacted entity as well as the affected metric of the impacted entity and the analyzed metric, OdTOI as distance of an outlier from the time of recognized impact (TOI), K1 as constant for outlier distance from mean (with value >0), K2 as constant for outlier distance from TOI (with value >0), and K1>K2.

K1 and K2 were introduced to deal with the possibility of Ov and OdTOI to potentially get very small or even 0, resulting in either OdTOI not being properly reflected in the PCP or even a division by zero (in case OdTOI equals to 0). The two values help avoid that.

The PCP is computed for all the identified outliers to get idea about those outliers which are more responsible in causing the performance issue and those which are less responsible. This is done by assigning weights to each outlier, where the weights determine the quantity by which an outlier contributes in causing the performance issue. The weights are drawn from the dependency tree and may vary from metric to metric and device to device. Other embodiments might use different formulas, or might include additional elements (like for example comparing the metric values with previously collected metric values—like one day ago, one week ago, one month ago, etc.)

The PCP is useful in comparing the degree of impact of different outliers in causing the performance issue. The RCA subsequently considers all the performance metric values (outliers) of all the SAN elements that have high PCP values, and identifies them as the probable root causes for the performance issue. Finally the RCA generates an order list of probable root causes based on the calculated PCPs and filtering out entities and metrics unlikely to contribute to the analyzed performance problem by either limiting the list to a maximum number of entries or by applying a threshold for the PCP and only include entities/metrics exceeding this threshold.

This resulting list of probable root cause could also be used to take automatic corrective/mitigation actions by reconfiguring the storage device accordingly (for example, by moving one—identified as probable root cause—storage volume to another pool to mitigate a current overload/IO saturation impacting another volume), hence automatically resolving the recognized performance problem.

As an simple example to explain the approach, after the focus entity and the time window have been identified (like: a performance problem was encountered for volume 1 around 2:00 AM, meaning volume 1 is the focus entity and 2:00 AM is the anchor of the time window), the corresponding dependency trees are instantiated by applying the dependencies to the actual device configuration. After that, the values of the metrics from the metric dependency tree for the entities from the configuration dependency tree will be analyzed for outliers (for example using the Chauvenet's algorithm). The PCP will then be calculated for the outliers, performing the following steps:

In a first step, the values of all outliers identified for a single metric are normalized. Each normalized outlier value is parameter Ov in the PCP formula. In a next step, the distance from the time of recognized impact (TOI) is used to define OdTOI·Df$_{Total}$ is computed for the outliers like in the following figure, with the weight for each dependency as numbers (RA=raid array).

Figure 5:
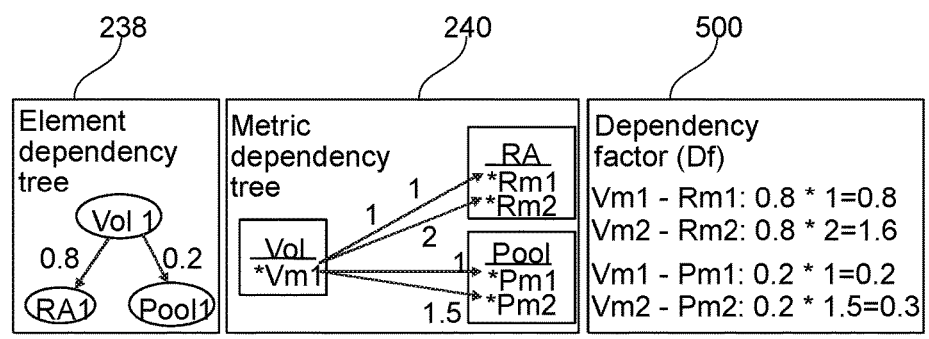
FIG. 5 illustrates an example of an instantiated configuration dependency tree and an instantiated performance metric dependency tree.

FIG. 5 shows an example of an instantiated configuration dependency tree 238 and an instantiated performance metric dependency tree 240. Both of these dependency trees 238 and 240 contain equivalent nodes and structure but they contain different dependencies. The box 500 shows how the cumulative weighting values dependency factor is calculated from the two dependency trees 238 and 240.

Figure 6:
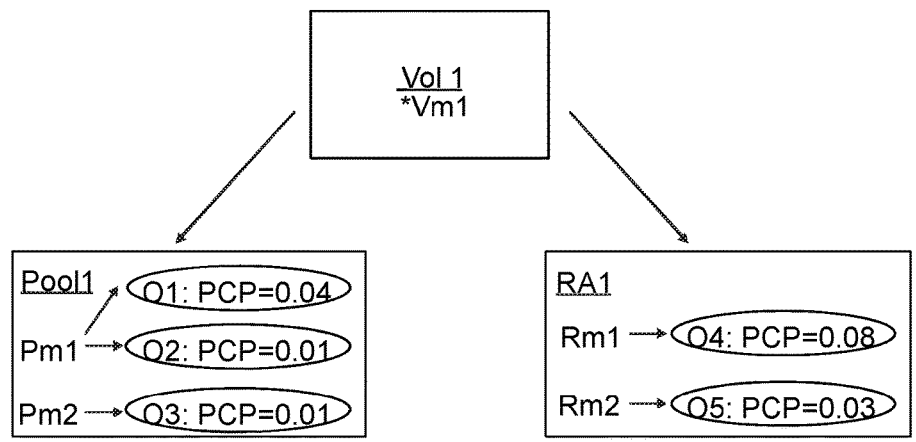
FIG. 6 illustrates a calculation of the problem contribution probability values.

Based on the parameters computed in the previous steps, the PCP is done as shown in FIG. 6. FIG. 6 illustrates the calculation of the problem contribution probability values. As per FIG. 6, two outliers are observed for Pm1, O1 and O2, and one outlier is observed for Pm2, O3. Similarly, outliers observed for Rm1 and Rm2 are O4 and O5 respectively. PPW is calculated for each of these outliers. For example, PCP calculated for O1=0.04, O2=0.01, O3=0.01, O4=0.08 and O5=0.03.

Next, PCP values for elements at one level are compared against each other, and the highest values (for example top two values) are used to determine, how to further descend into the dependency tree (to control the amount of computation needed). For this example, performing the steps described above for the next level would lead to the result showing the following figure, highlighting the top two PCP values identified for the next level as is shown below FIG. 7.

This step continues, until either a node on the dependency tree has been reached, or the analysis depth threshold is exceeded. Finally, the highest identified PCP values (in the example the three highest values are O6, O7, O8) at the lowest level are identified as the most likely root causes for the analyzed performance problem. The high PCP values on the path to these are called intermediate causes, influenced by lower level, influencing higher levels.

Figure 7:
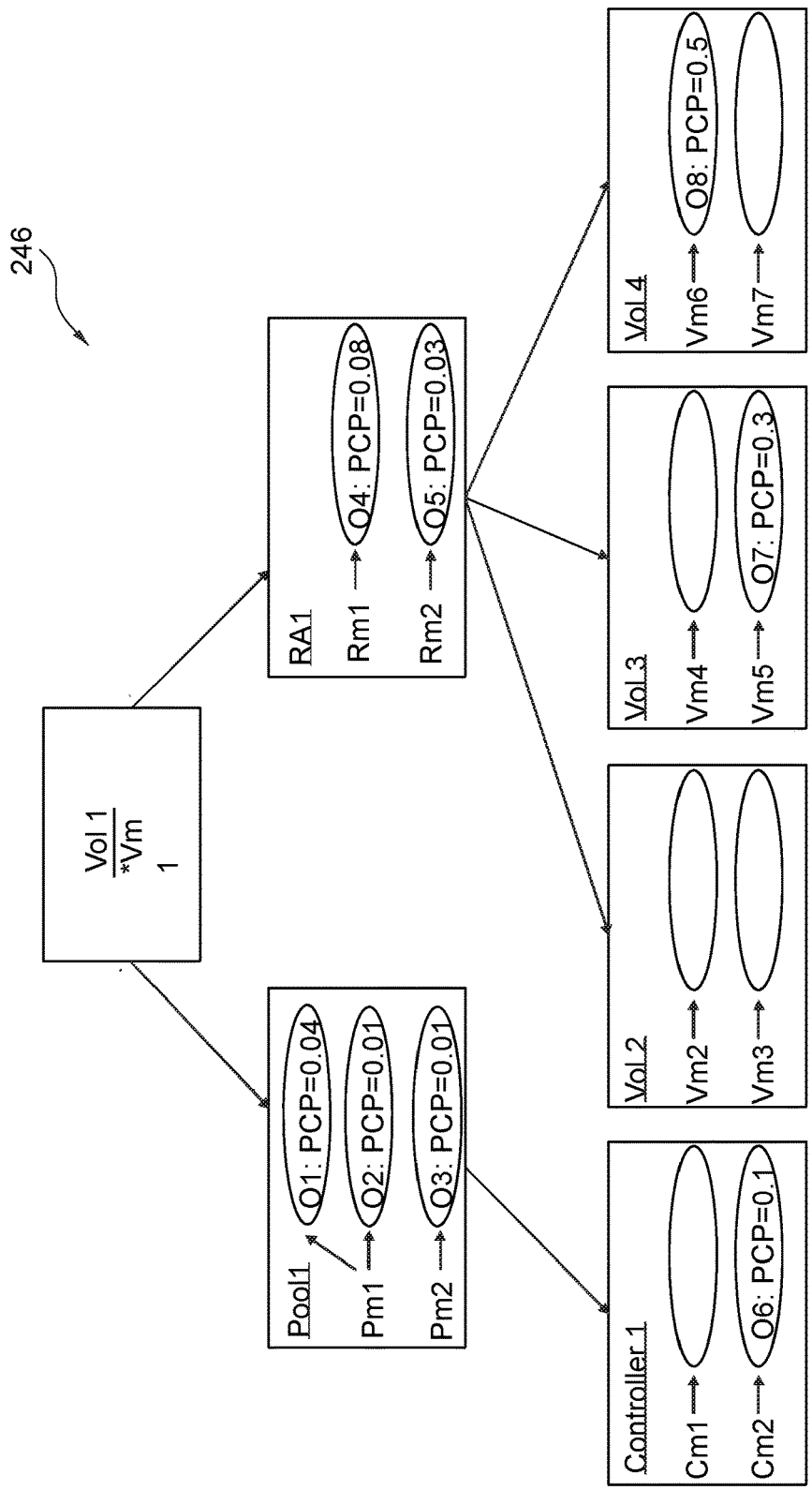
FIG. 7 shows the sequential list of outliers in the form of a tree.

FIG. 7 shows the sequential list of outliers 246 in the form of a tree which represents the system configuration at the time of the performance alert. The various outliers are labeled O1 to O8.

The invention claimed is:

1. A method for improving identification of one or more storage system elements responsible for a performance degradation in a digital storage system, wherein the digital storage system comprises one or more digital storage system elements, wherein the one or more digital storage system elements comprise one or more network components, wherein the digital storage system further comprises a plurality of digital storage devices, wherein the plurality of digital storage devices are connected by the one or more network components, the method comprising:

recording performance metric data for the one or more storage system elements in a database, wherein the performance metric data is time dependent, wherein the performance metric data includes a system configuration descriptive of one or more connections between one or more network components and a plurality of digital storage devices;

locating one or more outliers in the performance metric data for a focus time window using a statistical criterion;

calculating a problem contribution probability value for at least one of the one or more outliers, wherein the problem contribution probability value is a weighted value representation of a likelihood of the one or more outliers contributing to a performance problem for the focus time window based, at least in part, on an instantiated configuration dependency tree and an instantiated performance metric dependency tree;

wherein the problem contribution probability value for at least one of the one or more outliers is calculated utilizing a statistical evaluation engine based, at least in part, on a normalized value of the at least one of the one or more outliers, the weighting value calculated from the instantiated configuration dependency tree and the instantiated performance metric dependency tree, a temporal difference between an acquisition time of the at least one of the one or more outliers and the focus time, and one or more constants; and determining a sequential list of outliers utilizing an advisor component to guide a user to a data point from the one or more outliers, wherein an order in the sequential list of outliers is determined using the problem contribution probability value for comparing a degree of impact of the one or more outliers in causing a performance issue.

2. The method of claim 1, further comprises:
receiving a performance alert, wherein the performance alert comprises the focus time.

3. The method of claim 1, further comprises:
constructing a focus time window, wherein the focus time window brackets the focus time.

4. The method of claim 1, further comprises:
constructing the instantiated configuration dependency tree using the system configuration and one or more predetermined configuration dependency trees, wherein the one or more predetermined configuration dependency trees map performance relationships between the one or more storage system elements.

5. The method of claim 4, wherein the one or more predetermined configuration dependency trees is a template.

6. The method of claim 1, further comprises:
constructing the instantiated performance metric dependency tree using one or more predetermined performance metric dependency trees and the performance metric data, wherein the one or more performance metric dependency trees map dependency relationships between the performance metric data.

7. The method of claim 6, wherein the one or more predetermined performance metric dependency trees is a template.

8. The method of claim 1, wherein the statistical criterion includes a statistical algorithm, wherein the statistical algorithm identifies the one or more outliers by determining one or more aspects of the performance metric data outside of a probability band statistically expected to contain each of the one or more aspects of the performance metric data.

9. The method of claim 1, wherein the statistical algorithm is Chauvenet's algorithm.

10. The method of claim 1, further comprises:
determining a digital storage system element from the one or more storage system elements for each item in the sequential list of outliers, wherein determining includes examining the digital storage system element sequentially for performance degradation according to the sequential list of outliers.

11. A computer program product for improving identification of one or more storage system elements responsible for a performance degradation in a digital storage system, wherein the digital storage system comprises one or more digital storage system elements, wherein the one or more digital storage system elements comprise one or more network components, wherein the digital storage system further comprises a plurality of digital storage devices, wherein the plurality of digital storage devices are connected by the one or more network components, the computer program product comprising:
one or more computer readable storage media and program instructions stored on the one or more computer readable storage media, the program instructions comprising:
program instructions to record performance metric data for the one or more storage system elements in a database, wherein the performance metric data is time dependent, wherein the performance metric data includes a system configuration descriptive of one or more connections between one or more network components and a plurality of digital storage devices;
program instructions to locate one or more outliers in the performance metric data for a focus time window using a statistical criterion;
program instructions to calculate a problem contribution probability value for at least one of the one or more outliers, wherein the problem contribution probability value is a weighted value representation of a likelihood of the one or more outliers contributing to a performance problem for the focus time window based, at least in part, on an instantiated configuration dependency tree and an instantiated performance metric dependency tree;
wherein the problem contribution probability value for at least one of the one or more outliers is calculated utilizing a statistical evaluation engine based, at least in part, on a normalized value of the at least one of the one or more outliers, the weighting value calculated from the instantiated configuration dependency tree and the instantiated performance metric dependency tree, a temporal difference between an acquisition time of the at least one of the one or more outliers and the focus time, and one or more constants; and
program instructions to determine a sequential list of outliers utilizing an advisor component to guide a user to a data point from the one or more outliers, wherein an order in the sequential list of outliers is determined using the problem contribution probability value for comparing a degree of impact of the one or more outliers in causing a performance issue.

12. The computer program product of claim 11, further comprising:
program instructions to receive a performance alert, wherein the performance alert comprises the focus time.

13. The computer program product of claim 11, further comprising:
program instructions to construct a focus time window, wherein the focus time window brackets the focus time.

14. The computer program product of claim 11, further comprising:
program instructions to construct the instantiated configuration dependency tree using the system configuration and one or more predetermined configuration dependency trees, wherein the one or more predetermined configuration dependency trees map performance relationships between the one or more storage system elements.

15. The computer program product of claim 14, wherein the one or more predetermined configuration dependency trees is a template.

16. The computer program product of claim 11, further comprises:
program instructions to construct the instantiated performance metric dependency tree using one or more predetermined performance metric dependency trees and the performance metric data, wherein the one or more performance metric dependency trees map dependency relationships between the performance metric data.

17. The computer program product of claim 16, wherein the one or more predetermined performance metric dependency trees is a template.

18. The computer program product of claim 11, wherein the statistical criterion includes a statistical algorithm, wherein the statistical algorithm identifies the one or more outliers by determining one or more aspects of the performance metric data outside of a probability band statistically expected to contain each of the one or more aspects of the performance metric data.

19. The computer program product of claim 11, wherein the statistical algorithm is Chauvenet's algorithm.

20. The computer program product of claim 11, further comprising:
program instructions to determine a digital storage system element from the one or more storage system elements for each item in the sequential list of outliers, wherein determining includes examining the digital storage system element sequentially for performance degradation according to the sequential list of outliers.

* * * * *